(12) United States Patent
Hutchison et al.

(10) Patent No.: US 7,017,352 B2
(45) Date of Patent: Mar. 28, 2006

(54) COOLING OF EXTRUDED AND COMPRESSION MOLDED MATERIALS

(75) Inventors: Herbert L. Hutchison, Blacklick, OH (US); Jeffrey R. Brandt, Blacklick, OH (US)

(73) Assignee: Crane Plastics Company LLC, Columbus, OH (US)

( * ) Notice: Subject to any disclaimer, the term of this patent is extended or adjusted under 35 U.S.C. 154(b) by 9 days.

(21) Appl. No.: 10/280,735

(22) Filed: Oct. 25, 2002

(65) Prior Publication Data

US 2006/0010883 A1    Jan. 19, 2006

Related U.S. Application Data

(63) Continuation-in-part of application No. 10/131,578, filed on Apr. 24, 2002, now Pat. No. 6,637,213, which is a continuation-in-part of application No. 10/025,432, filed on Dec. 19, 2001, now Pat. No. 6,708,504, which is a continuation-in-part of application No. 09/766,054, filed on Jan. 19, 2001, now Pat. No. 6,578,368.

(51) Int. Cl.
*F25D 17/02* (2006.01)

(52) U.S. Cl. ............................. 62/64; 62/50.1; 62/62; 62/63; 425/71

(58) Field of Classification Search ............ 62/45.1, 62/50.1, 52.1, 62, 63, 64, 51.1; 425/67, 70, 425/71
See application file for complete search history.

(56) References Cited

U.S. PATENT DOCUMENTS

| | | | |
|---|---|---|---|
| 2,010,207 A | 8/1935 | Topham et al. | 18/15 |
| 2,188,936 A | 1/1940 | Semon | 18/55 |
| 2,489,373 A | 11/1949 | Gilman | 260/37 |
| 2,514,471 A | 7/1950 | Calhoun | 18/8 |
| 2,519,442 A | 8/1950 | Delorme et al. | 260/37 |

(Continued)

FOREIGN PATENT DOCUMENTS

DE    2042176    4/1971

(Continued)

OTHER PUBLICATIONS

Bessemer, Bob *Conair and MEI Join Forces to Develop Nitrogen Gas Cooling for Plastics Extrusion*. Insights in Extrusion, Issue II, Summer 2000.

(Continued)

*Primary Examiner*—Cheryl Tyler
*Assistant Examiner*—Richard L. Leung
(74) *Attorney, Agent, or Firm*—Standley Law Group LLP

(57) ABSTRACT

The present invention relates to a system and a method for cooling extruded and molded materials. The present invention is especially useful to thoroughly cool an extrudate by directing a cooling fluid toward a surface of the extrudate (e.g., an interior surface that defines a hollow portion of an extrudate). Hollows may be created in order to reduce material, weight, and/or processing time. A cooling fluid is diverted toward the surface of the extrudate so as to cool the material and assist in solidification. A baffle may serve to divert the cooling fluid in the desired direction. In another example, the extrudate may be partially or totally immersed in a liquid cryogenic fluid. Increases in production line throughput may result by rapidly cooling the molded material. In addition, the more efficient cooling may be achieved with a lesser amount of the cooling fluid, and the velocity and temperature of the cooling fluid may be reduced. Other uses for the present invention include injection molding, compression molding, gas assist molding, and co-extrusion.

20 Claims, 12 Drawing Sheets

U.S. PATENT DOCUMENTS

| | | | |
|---|---|---|---|
| 2,558,378 A | 6/1951 | Petry | 260/41 |
| 2,635,976 A | 4/1953 | Meiler et al. | 154/132 |
| 2,680,102 A | 6/1954 | Becher | 260/17.3 |
| 2,789,903 A | 4/1957 | Lukman et al. | 92/21 |
| 2,935,763 A | 5/1960 | Newman et al. | 18/55 |
| 3,287,480 A | 11/1966 | Wechsler et al. | 264/122 |
| 3,308,218 A | 3/1967 | Etal | 264/121 |
| 3,308,507 A | 3/1967 | Black | 18/12 |
| 3,309,444 A | 3/1967 | Schueler | 264/109 |
| 3,492,388 A | 1/1970 | Inglin-Knüsel | 264/129 |
| 3,493,527 A | 2/1970 | Schueler | 260/17.2 |
| 3,562,373 A | 2/1971 | Logrippo | 264/118 |
| 3,599,286 A | 8/1971 | Karet | 425/464 |
| 3,645,939 A | 2/1972 | Gaylord | 260/17.4 GC |
| 3,671,615 A | 6/1972 | Price | 264/39 |
| 3,864,201 A | 2/1975 | Susuki et al. | 161/160 |
| 3,867,493 A | 2/1975 | Seki | 264/45.9 |
| 3,878,143 A | 4/1975 | Baumann et al. | 260/17.4 R |
| 3,879,505 A | 4/1975 | Boutillier et al. | 264/48 |
| 3,888,810 A | 6/1975 | Shinomura | 260/17.4 BB |
| 3,899,559 A | 8/1975 | Johnanson et al. | 264/115 |
| 3,907,914 A | 9/1975 | Carrow | 264/314 |
| 3,908,902 A | 9/1975 | Collins et al. | 238/83 |
| 3,922,328 A | 11/1975 | Johnson | 264/46.1 |
| 3,931,384 A | 1/1976 | Forquer et al. | 264/120 |
| 3,943,079 A | 3/1976 | Hamed | 260/17.4 BB |
| 3,954,555 A | 5/1976 | Kole et al. | 162/136 |
| 3,956,541 A | 5/1976 | Pringle | 428/2 |
| 3,956,555 A | 5/1976 | McKean | 428/106 |
| 3,959,431 A | 5/1976 | Nissel | 264/171 |
| 3,969,459 A | 7/1976 | Fremont et al. | 264/109 |
| 4,005,162 A | 1/1977 | Bucking | 264/25 |
| 4,012,348 A | 3/1977 | Chelland et al. | 260/28.5 R |
| 4,016,232 A | 4/1977 | Pringle | 264/112 |
| 4,016,233 A | 4/1977 | Pringle | 264/122 |
| 4,018,722 A | 4/1977 | Baker | 260/2.3 |
| 4,029,831 A | 6/1977 | Daunheimer | 427/264 |
| 4,045,603 A | 8/1977 | Smith | 428/2 |
| 4,054,632 A | 10/1977 | Franke | 264/145 |
| 4,056,591 A | 11/1977 | Goettler et al. | 264/108 |
| 4,058,580 A | 11/1977 | Flanders | 264/113 |
| 4,071,479 A | 1/1978 | Broyde et al. | 260/2.3 |
| 4,071,494 A | 1/1978 | Gaylord | 260/42.14 |
| 4,081,582 A | 3/1978 | Butterworth et al. | 428/284 |
| 4,097,648 A | 6/1978 | Pringle | 428/326 |
| 4,102,106 A | 7/1978 | Golder et al. | 52/533 |
| 4,107,110 A | 8/1978 | Lachowicz et al. | 260/17.4 CL |
| 4,115,497 A | 9/1978 | Halmø et al. | 264/115 |
| 4,129,132 A | 12/1978 | Butterworth et al. | 604/367 |
| 4,130,616 A | 12/1978 | Clifford | 264/514 |
| 4,145,389 A | 3/1979 | Smith | 264/40.7 |
| 4,157,415 A | 6/1979 | Lindenberg | 428/284 |
| 4,168,251 A | 9/1979 | Schinzel et al. | 260/17.4 R |
| 4,178,411 A | 12/1979 | Cole et al. | 428/310 |
| 4,181,764 A | 1/1980 | Totten | 428/155 |
| 4,187,352 A | 2/1980 | Klobbie | 521/79 |
| 4,191,798 A | 3/1980 | Schumacher et al. | 428/95 |
| 4,192,839 A | 3/1980 | Hayashi et al. | 264/45.5 |
| 4,203,876 A | 5/1980 | Dereppe et al. | 260/17.4 R |
| 4,221,621 A | 9/1980 | Seki et al. | 156/78 |
| 4,228,116 A | 10/1980 | Colombo et al. | 264/119 |
| 4,239,679 A | 12/1980 | Rolls et al. | 260/42.49 |
| 4,241,125 A | 12/1980 | Canning et al. | 428/158 |
| 4,241,133 A | 12/1980 | Lund et al. | 428/326 |
| 4,244,903 A | 1/1981 | Schnause | 264/68 |
| 4,248,743 A | 2/1981 | Goettler | 260/17.4 BB |
| 4,248,820 A | 2/1981 | Haataja | 264/113 |
| 4,250,222 A | 2/1981 | Mavel et al. | 428/285 |
| 4,263,184 A | 4/1981 | Leo et al. | 260/17.4 CL |
| 4,263,196 A | 4/1981 | Schumacher et al. | 260/33.6 |
| 4,272,577 A | 6/1981 | Lyng | 428/112 |
| 4,273,688 A | 6/1981 | Porzel et al. | 260/17.4 R |
| 4,277,428 A | 7/1981 | Luck et al. | 264/118 |
| 4,290,988 A | 9/1981 | Nopper et al. | 264/112 |
| 4,297,408 A | 10/1981 | Stead et al. | 428/240 |
| 4,303,019 A | 12/1981 | Haataja et al. | 108/51.1 |
| 4,305,901 A | 12/1981 | Prince et al. | 264/176 R |
| 4,317,765 A | 3/1982 | Gaylord | 523/204 |
| 4,323,625 A | 4/1982 | Coran et al. | 428/361 |
| 4,351,873 A | 9/1982 | Davis | 428/198 |
| 4,376,144 A | 3/1983 | Goettler | 428/36 |
| 4,382,108 A | 5/1983 | Carroll et al. | 428/326 |
| 4,382,758 A | 5/1983 | Nopper et al. | 425/82.1 |
| 4,393,020 A | 7/1983 | Li et al. | 264/108 |
| 4,414,267 A | 11/1983 | Coran et al. | 428/288 |
| 4,420,351 A | 12/1983 | Lussi et al. | 156/62.4 |
| 4,430,468 A | 2/1984 | Schumacher | 524/109 |
| 4,440,708 A | 4/1984 | Haataja et al. | 264/109 |
| 4,480,061 A | 10/1984 | Coughlin et al. | 524/13 |
| 4,481,701 A | 11/1984 | Hewitt | 29/416 |
| 4,491,553 A | 1/1985 | Yamada et al. | 264/51 |
| 4,503,115 A | 3/1985 | Hemels et al. | 428/281 |
| 4,505,869 A | 3/1985 | Nishibori | 264/115 |
| 4,506,037 A | 3/1985 | Suzuki et al. | 521/82 |
| 4,508,595 A | 4/1985 | Gåsland | 162/158 |
| 4,562,218 A | 12/1985 | Fornadel et al. | 524/15 |
| 4,573,893 A | 3/1986 | Waters et al. | 425/71 |
| 4,594,372 A | 6/1986 | Natov et al. | 523/208 |
| 4,597,928 A | 7/1986 | Terentiev et al. | 264/87 |
| 4,610,900 A | 9/1986 | Nishibori | 428/15 |
| 4,645,631 A | 2/1987 | Hegenstaller et al. | 264/69 |
| 4,659,754 A | 4/1987 | Edwards et al. | 523/214 |
| 4,663,107 A * | 5/1987 | Takada et al. | 264/519 |
| 4,663,225 A | 5/1987 | Farley et al. | 428/290 |
| 4,687,793 A | 8/1987 | Motegi et al. | 523/200 |
| 4,717,742 A | 1/1988 | Beshay | 523/203 |
| 4,734,236 A | 3/1988 | Davis | 264/112 |
| 4,737,532 A | 4/1988 | Fujita et al. | 524/13 |
| 4,746,688 A | 5/1988 | Bistak et al. | 523/220 |
| 4,769,109 A | 9/1988 | Tellvik et al. | 162/123 |
| 4,769,274 A | 9/1988 | Tellvik et al. | 428/218 |
| 4,783,493 A | 11/1988 | Motegi et al. | 524/13 |
| 4,788,017 A * | 11/1988 | Schlomer et al. | 264/28 |
| 4,789,604 A | 12/1988 | van der Hoeven | 428/503 |
| 4,790,966 A | 12/1988 | Sandberg et al. | 264/39 |
| 4,791,020 A | 12/1988 | Kokta | 428/326 |
| 4,800,214 A | 1/1989 | Waki et al. | 521/84.1 |
| 4,801,495 A | 1/1989 | van der Hoeven | 428/286 |
| 4,807,964 A * | 2/1989 | Sare | 385/143 |
| 4,818,590 A | 4/1989 | Prince et al. | 428/213 |
| 4,818,604 A | 4/1989 | Tock | 428/319.9 |
| 4,820,749 A | 4/1989 | Beshay | 523/203 |
| 4,851,458 A | 7/1989 | Hopperdietzel | 523/205 |
| 4,865,788 A | 9/1989 | Davis | 264/112 |
| 4,874,000 A * | 10/1989 | Tamol et al. | 131/375 |
| 4,889,673 A | 12/1989 | Takimoto | 264/118 |
| 4,894,192 A | 1/1990 | Warych | 264/68 |
| 4,915,764 A | 4/1990 | Miani | 156/244.19 |
| 4,927,572 A | 5/1990 | van der Hoeven | 264/22 |
| 4,927,579 A | 5/1990 | Moore | 264/101 |
| 4,935,182 A | 6/1990 | Ehner et al. | 264/112 |
| 4,960,548 A | 10/1990 | Ikeda et al. | 264/40.4 |
| 4,968,463 A | 11/1990 | Levasseur | 264/40.1 |
| 4,973,440 A | 11/1990 | Tamura et al. | 264/114 |
| 4,978,489 A | 12/1990 | Radvan et al. | 264/118 |
| 4,978,575 A * | 12/1990 | Ziess | 428/402 |
| 4,988,478 A | 1/1991 | Held | 264/518 |
| 5,002,713 A | 3/1991 | Palardy et al. | 264/109 |
| 5,008,310 A | 4/1991 | Beshay | 524/13 |
| 5,009,586 A | 4/1991 | Pallmann | 425/311 |
| 5,049,223 A * | 9/1991 | Dais et al. | 156/244.11 |
| 5,049,334 A | 9/1991 | Bach | 264/122 |
| 5,057,167 A | 10/1991 | Gersbeck | 156/62.2 |
| 5,064,592 A | 11/1991 | Ueda et al. | 264/112 |

| | | | |
|---|---|---|---|
| 5,075,057 A | 12/1991 | Hoedl | 264/115 |
| 5,075,359 A | 12/1991 | Castagna et al. | 524/13 |
| 5,078,937 A | 1/1992 | Eela | 264/109 |
| 5,082,605 A | 1/1992 | Brooks et al. | 264/40.6 |
| 5,087,400 A | 2/1992 | Theuveny | 264/115 |
| 5,088,910 A | 2/1992 | Goforth et al. | 425/142 |
| 5,091,436 A | 2/1992 | Frisch et al. | 521/137 |
| 5,096,046 A | 3/1992 | Goforth et al. | 198/604 |
| 5,096,406 A | 3/1992 | Brooks et al. | 425/205 |
| 5,110,663 A | 5/1992 | Nishiyama et al. | 428/195 |
| 5,110,843 A | 5/1992 | Bries et al. | 521/159 |
| 5,120,776 A | 6/1992 | Raj et al. | 524/13 |
| 5,137,673 A | 8/1992 | Bourcier et al. | 264/151 |
| 5,137,969 A * | 8/1992 | Marten et al. | 525/56 |
| 5,153,241 A | 10/1992 | Beshay | 524/8 |
| 5,160,784 A | 11/1992 | Shmidt et al. | 425/316.6 |
| 5,194,461 A | 3/1993 | Bergquist et al. | 524/13 |
| 5,218,807 A | 6/1993 | Fulford | 52/455 |
| 5,219,634 A | 6/1993 | Aufderhaar | 428/156 |
| 5,272,000 A | 12/1993 | Chenoweth et al. | 428/283 |
| 5,276,082 A | 1/1994 | Forry et al. | 524/504 |
| 5,284,710 A | 2/1994 | Hartley et al. | 428/421 |
| 5,288,772 A | 2/1994 | Hon | 524/35 |
| 5,295,366 A * | 3/1994 | Lopez et al. | 62/266 |
| 5,302,634 A | 4/1994 | Mushovic | 523/219 |
| 5,351,495 A * | 10/1994 | Lermuzeaux | 62/63 |
| 5,356,697 A | 10/1994 | Jonas | 428/77 |
| 5,369,147 A | 11/1994 | Mushovic | 523/219 |
| 5,393,536 A | 2/1995 | Brandt et al. | 425/112 |
| 5,406,768 A | 4/1995 | Giuseppe et al. | 52/730.4 |
| 5,422,170 A | 6/1995 | Iwata et al. | 428/218 |
| 5,435,954 A | 7/1995 | Wold | 264/115 |
| 5,441,801 A | 8/1995 | Deaner et al. | 428/326 |
| 5,458,834 A | 10/1995 | Faber et al. | 264/109 |
| 5,474,722 A | 12/1995 | Woodhams | 264/45.3 |
| 5,480,602 A | 1/1996 | Nagaich | 264/122 |
| 5,486,553 A | 1/1996 | Deaner et al. | 524/13 |
| 5,497,594 A | 3/1996 | Giuseppe et al. | 52/730.4 |
| 5,505,900 A | 4/1996 | Suwanda et al. | 264/477 |
| 5,516,472 A | 5/1996 | Laver | 264/118 |
| 5,518,677 A | 5/1996 | Deaner et al. | 264/142 |
| 5,532,065 A | 7/1996 | Gübitz et al. | 428/480 |
| 5,537,789 A | 7/1996 | Minke et al. | 52/313 |
| 5,539,027 A | 7/1996 | Deaner et al. | 524/13 |
| 5,574,094 A | 11/1996 | Malucelli et al. | 525/54.3 |
| 5,576,374 A | 11/1996 | Betso et al. | 524/451 |
| 5,585,155 A | 12/1996 | Heikkila et al. | 428/36 |
| 5,593,625 A | 1/1997 | Riebel et al. | 264/115 |
| 5,597,586 A | 1/1997 | Wilson et al. | 425/67 |
| 5,695,874 A | 12/1997 | Deaner et al. | 428/326 |
| 5,725,939 A | 3/1998 | Nishibori | 428/292.4 |
| 5,730,914 A * | 3/1998 | Ruppmann, Sr. | 264/28 |
| 5,735,092 A | 4/1998 | Clayton et al. | 52/309.9 |
| 5,759,680 A | 6/1998 | Brooks et al. | 428/326 |
| 5,773,138 A | 6/1998 | Seethamraju et al. | 428/326 |
| 5,776,841 A | 7/1998 | Bondoc et al. | 442/320 |
| 5,783,125 A | 7/1998 | Bastone et al. | 264/45.3 |
| 5,795,641 A | 8/1998 | Pauley et al. | 428/134 |
| 5,807,514 A | 9/1998 | Grinshpun et al. | 264/46.6 |
| 5,827,462 A * | 10/1998 | Brandt et al. | 264/179 |
| 5,827,607 A | 10/1998 | Deaner et al. | 428/326 |
| 5,836,128 A | 11/1998 | Groh et al. | 52/580 |
| 5,847,016 A | 12/1998 | Cope | 52/84.1 |
| 5,863,064 A | 1/1999 | Rheinlander et al. | 280/732 |
| 5,863,480 A | 1/1999 | Suwanda | 264/209.8 |
| 5,866,264 A | 2/1999 | Zehner et al. | 428/481 |
| 5,882,564 A | 3/1999 | Puppin | 264/177.16 |
| 5,910,358 A | 6/1999 | Thoen et al. | 428/316.6 |
| 5,932,334 A | 8/1999 | Deaner et al. | 428/292.4 |
| 5,948,505 A | 9/1999 | Puppin | 428/121 |
| 5,948,524 A | 9/1999 | Seethamraju et al. | 428/326 |
| 5,951,927 A | 9/1999 | Cope | 264/54 |
| 5,965,075 A | 10/1999 | Pauley et al. | 264/176.1 |
| 5,981,067 A | 11/1999 | Seethamraju et al. | 428/393 |
| 5,985,429 A | 11/1999 | Plummer et al. | 428/220 |
| 6,004,652 A | 12/1999 | Clark | 428/133 |
| 6,004,668 A | 12/1999 | Deaner et al. | 428/326 |
| 6,007,656 A | 12/1999 | Heikkila et al. | 156/180 |
| 6,011,091 A | 1/2000 | Zehner | 524/13 |
| 6,015,611 A | 1/2000 | Deaner et al. | 428/326 |
| 6,015,612 A | 1/2000 | Deaner et al. | 428/326 |
| 6,035,588 A | 3/2000 | Zehner et al. | 52/98 |
| 6,044,604 A | 4/2000 | Clayton et al. | 52/309.9 |
| 6,054,207 A | 4/2000 | Finley | 428/317.9 |
| 6,066,680 A | 5/2000 | Cope | 521/79 |
| 6,067,776 A * | 5/2000 | Heuer et al. | 53/440 |
| 6,103,791 A | 8/2000 | Zehner | 524/13 |
| 6,106,944 A | 8/2000 | Heikkila et al. | 428/397 |
| 6,114,008 A | 9/2000 | Eby et al. | 428/151 |
| 6,117,924 A | 9/2000 | Brandt | 524/13 |
| 6,122,877 A | 9/2000 | Hendrickson et al. | 52/520 |
| 6,131,355 A | 10/2000 | Groh et al. | 52/592.1 |
| 6,133,348 A | 10/2000 | Kolla et al. | 524/9 |
| 6,153,293 A | 11/2000 | Dahl et al. | 428/310.5 |
| 6,180,257 B1 | 1/2001 | Brandt et al. | 428/532 |
| 6,207,729 B1 | 3/2001 | Medoff et al. | 523/129 |
| 6,210,616 B1 | 4/2001 | Suwanda | 264/151 |
| 6,210,792 B1 | 4/2001 | Seethamraju et al. | 428/326 |
| 6,248,813 B1 | 6/2001 | Zehner | 524/13 |
| 6,265,037 B1 | 7/2001 | Godavarti et al. | 428/34 |
| 6,272,808 B1 | 8/2001 | Groh et al. | 52/592.1 |
| 6,280,667 B1 | 8/2001 | Koenig et al. | 264/68 |
| 6,284,098 B1 | 9/2001 | Jacobsen | 162/150 |
| 6,295,777 B1 | 10/2001 | Hunter et al. | 52/519 |
| 6,295,778 B1 | 10/2001 | Burt | 52/592.6 |
| 6,323,279 B1 * | 11/2001 | Gunthergerg et al. | 525/70 |
| 6,337,138 B1 | 1/2002 | Zehner | 428/511 |
| 6,341,458 B1 | 1/2002 | Burt | 52/287.1 |
| 6,342,172 B1 | 1/2002 | Finley | 264/45.3 |
| 6,344,268 B1 | 2/2002 | Stucky et al. | 428/317.9 |
| 6,344,504 B1 | 2/2002 | Zehner et al. | 524/14 |
| 6,346,160 B1 | 2/2002 | Puppin | 156/88 |
| 6,357,197 B1 | 3/2002 | Serino et al. | 52/738.1 |
| 6,358,585 B1 | 3/2002 | Wolff | 428/36.6 |
| 6,360,508 B1 | 3/2002 | Pelfrey et al. | 52/520 |
| 6,362,252 B1 | 3/2002 | Prutkin | 523/200 |
| 6,409,952 B1 | 6/2002 | Hacker et al. | 264/171.1 |
| 6,423,257 B1 | 7/2002 | Stobart et al. | 264/145 |
| 6,453,630 B1 | 9/2002 | Buhrts et al. | 52/177 |
| 6,464,913 B1 | 10/2002 | Korney, Jr. | 264/102 |
| 6,498,205 B1 | 12/2002 | Zehner | 524/14 |
| 6,511,757 B1 | 1/2003 | Brandt et al. | 428/532 |
| 6,531,010 B1 | 3/2003 | Puppin | 156/88 |
| 6,569,540 B1 | 5/2003 | Preston et al. | 428/537.1 |
| 6,578,368 B1 | 6/2003 | Brandt et al. | 62/63 |
| 6,579,605 B1 | 6/2003 | Zehner | 428/319.9 |
| 6,590,004 B1 | 7/2003 | Zehner | 521/84.1 |
| 6,605,245 B1 | 8/2003 | Dubelsten et al. | 264/446 |
| 6,617,376 B1 | 9/2003 | Korney, Jr. | 524/13 |
| 6,632,863 B1 | 10/2003 | Hutchison et al. | 524/13 |
| 6,637,213 B1 | 10/2003 | Hutchison et al. | 62/63 |
| 6,662,515 B1 | 12/2003 | Buhrts et al. | 52/301 |
| 6,680,090 B1 | 1/2004 | Godavarti et al. | 428/34 |
| 6,682,789 B1 | 1/2004 | Godavarti et al. | 428/34 |
| 6,682,814 B1 | 1/2004 | Hendrickson et al. | 428/326 |
| 6,685,858 B1 | 2/2004 | Korney, Jr. | 264/102 |
| 6,708,504 B1 | 3/2004 | Brandt et al. | 62/63 |
| 6,716,522 B1 | 4/2004 | Matsumoto et al. | 428/326 |
| 6,780,359 B1 | 8/2004 | Zehner et al. | 264/115 |
| 6,863,972 B1 | 3/2005 | Burger et al. | 428/319.3 |
| 2001/0019749 A1 | 9/2001 | Godavarti et al. | 428/34.2 |
| 2001/0051242 A1 | 12/2001 | Godavarti et al. | 428/36.9 |
| 2001/0051243 A1 | 12/2001 | Godavarti et al. | 428/36.9 |
| 2002/0015820 A1 | 2/2002 | Puppin | 428/121 |
| 2002/0038684 A1 | 4/2002 | Puppin | 156/88 |
| 2002/0040557 A1 | 4/2002 | Felton | 52/309.13 |

| | | | |
|---|---|---|---|
| 2002/0066248 A1 | 6/2002 | Buhrts et al. | 52/301 |
| 2002/0090471 A1 | 7/2002 | Burger et al. | 428/15 |
| 2002/0092256 A1 | 7/2002 | Hendrickson et al. | 52/519 |
| 2002/0106498 A1 | 8/2002 | Deaner et al. | 428/292.4 |
| 2002/0143083 A1 | 10/2002 | Korney, Jr. | 524/13 |
| 2002/0166327 A1 | 11/2002 | Brandt et al. | 62/63 |
| 2002/0174663 A1 | 11/2002 | Hutchison et al. | 62/62 |
| 2002/0192401 A1 | 12/2002 | Matsumoto et al. | 428/15 |
| 2002/0192431 A1 | 12/2002 | Edgman | 428/181 |
| 2003/0021915 A1 | 1/2003 | Rohatgi et al. | 428/15 |
| 2003/0025233 A1 | 2/2003 | Korney, Jr. | 264/102 |
| 2003/0087994 A1 | 5/2003 | Frechette | 524/9 |
| 2003/0087996 A1 | 5/2003 | Hutchinson et al. | 524/27 |
| 2003/0154662 A1 | 8/2003 | Bruchu et al. | 52/87 |

FOREIGN PATENT DOCUMENTS

| | | |
|---|---|---|
| DE | 3801574 | 8/1989 |
| DE | 4033849 | 10/1990 |
| DE | 4221070 | 12/1993 |
| EP | 0269470 | 1/1988 |
| EP | 0586211 | 3/1994 |
| EP | 0586212 | 3/1994 |
| EP | 0586213 | 3/1994 |
| EP | 0668142 | 8/1995 |
| EP | 0747419 | 12/1996 |
| FR | 2270311 | 2/1974 |
| FR | 2365017 | 4/1978 |
| FR | 2445885 | 8/1980 |
| FR | 2564374 | 11/1985 |
| GB | 1443194 | 7/1976 |
| GB | 2036148 | 6/1980 |
| GB | 2104903 | 3/1983 |
| GB | 2171953 | 9/1986 |
| GB | 2186655 | 8/1987 |
| WO | WO 90/08020 | 7/1990 |
| WO | WO 99/11444 | 3/1999 |
| WO | WO 00/11282 | 3/2000 |
| WO | WO 00/34017 | 6/2000 |
| WO | WO 00/39207 | 7/2000 |
| WO | WO 01/66873 | 9/2001 |
| WO | WO 02/057692 | 7/2002 |
| WO | WO 02/079317 | 10/2002 |
| WO | WO 03/091642 | 11/2003 |

OTHER PUBLICATIONS

Bendtsen et al., Mechanical Properties of Wood, pp. 4-2 to 4-44.
Bibliography of Solid Phase Extrusion, pp. 187-195.
Brzoskowski et al., Air-Lubricated Die for Extrusion of Rubber Compounds, Rubber Chemistry and Technology, vol. 60, pp. 945-956.
Collier et al., High Strength Extrudates by Melt Transformation Coextrusion, ANTEC, 1987, pp. 497-502.
Collier et al., Streamlined Dies and Profile Extrusion, ANTEC, 1987, pp. 203-206.
Company News, Plastics Industry News, May 1994, pp. 70-71.
Dalväg et al., The Efficiency of Cellulosic Fillers in Common Thermoplastics. Part II. Filling with Processing Aids and Coupling Agents, 1985, vol. 11, pp. 9-38.
Fiberloc Polymer Composites, B.F. Goodrich, Geon Vinyl Division, section 1, pp. 2-15.
Fill Thermoplastics with Wood, Modern Plastics, May 1974, pp. 54-55.
Fillers for Thermoplastics: Beyond Resin Stretching, Modern Plastics International, Oct. 1976, pp. 12-15.
From Sweden: Extruded Interior Trim Made of PVC and Wood Flour, Plastic Building Construction, vol. 9 No. 5, 1986, pp. 5-6.
Henrici-Olive et al., Integral/Structural Ploymer Foams, Technology, Properties and Applications, Springer-Verlag, pp. 111-122.
Klason et al., The Efficiency of Cellulosic Fillers in Common Thermoplastics. Part 1. Filling without Processing Aids or Coupling Agents, Polymeric Materials, 1984, vol. 10, pp. 159-187.
Kokta et al., Composites of Poly(Vinyl Chloride) and Wood Fibers. Part II: Effect of Chemical Treatment, Polymer Composites, Apr. 1990, pp. 84-89.
Kokta et al., Composites of Polyvinyl Chloride-Wood Fibers. I. Effect of Isocyanate as a Bonding Agent, Polym.-Plast. Technol. Eng., 1990, 29(1&2), pp. 87-118.
Kokta et al., Composites of Polyvinyl Chloride-Wood Fibers. III: Effect of Silane as Coupling Agent, Journal of Vinyl Technology, Sep. 1990, pp. 146-153.
Kokta et al., Use of Grafted Wood Fibers in Thermoplastic Composites v. Polystyrene.
Centre de recherche en pâtes et papiers, Université du Québec á Trois-Riviéres, Canada.
Kokta et al., Use of Wood Fibers in Thermoplastic Composites, Polymer Composites, Oct. 1983, pp. 229-232.
Maldas et al., Composites of Polyvinyl Chloride-Wood Fibers: IV. Effect of the Nature of Fibers, Journal of Vinyl Technology, Jun. 1989, pp. 90-98.
Maldas, et al.. Improving Adhesion of Wood Fiber with Polystrene by the Chemical Treatment of Fiber with a Coupling Agent and the Influence on the Mechanical Properties of Composites, Journal of Adhesion Science Technology, vol. 3 No. 7, pp. 529-539 (1989).
Myers et al., "Wood flour and polypropylene or high-density polyethylene composites: influence of maleated polypropylene concentration and extrusion temperature on properties", "Wood Fiber/Polymer Composites: Fundamental Concepts, Processes, and Material Options", pp. 49-56.
Myers et al., Bibliography: Composites from Plastics and Wood-Based Fillers, USDA Forest Products Laboratory, Madison, WI, pp. 1-27 odds (1991).
Myers et al., Effects of Composition and Polypropylene Melt Flow on Polypropylene-Waste Newspaper Composites, ANTEC, 1984, pp. 602-604.
Pornnimit et al., Extrusion of Self-Reinforced Polyethylene, Advances in Polymer Technology, vol. 11, No. 2, pp. 92-98.
Raj et al., Use of Wood Fiber as Filler in Common Thermoplastics: Studies on Mechanical Properties, Science and Engineering of Composite Materials, vol. 1 No. 3, 1989, pp. 85-98.
Raj et al., Use of Wood Fibers in Thermoplastics, VII. The Effect of Coupling Agents in Polyethylene-Wood Fiber Composites, Journal of Applied Polymer Science, vol. 37, pp. 1089-1103 (1989).
Resin Stretching: Accent on Performance, Modern Plastic International, Jan. 1974, pp. 58-60.
Rogalski et al., Poly(Vinyl-Chloride) Wood Fiber Composites, ANTEC, 1987, pp. 1436-1441.
Sonwood Outline, Apr. 1975.
Sonwood: a new PVC wood-flour alloy for Extrusions and other Plastic Processing Techniques, Sonesson Plast AB, Malmo, Sweden.
Thomas et al., Wood Fibers for Reinforcing Fillers for Polyolefins, ANTEC, 1984, pp. 687-689.
Wood Filled PVC, Plastics Industry News, Jul. 1996, pp. 6.

Woodhams et al., Wood Fibers for Reinforcing Fillers for Polyolefins, Polymer Engineering and Science, Oct. 1984, pp. 1166-1171.

Yam et al., Composites from Compounding Wood Fibers With Recycled High Density Polyethylene, Polymer Engineering and Science, mid-June 1990, pp. 693-699, vol. 30, No. 11.

Yuskova, et al., Interaction of Components in Poly(Vinly Choloride) Filled in Polymetization, Makroniol Chem., Macromol. Symp. 29, 315-320 (1989).

Zadorecki et al., Future Prospects for Wood Cellulose as Reinforcement In Organic Polymer Composites, Polymer Composites, Apr. 1989, pp. 69-77.

* cited by examiner

COOLING OF EXTRUDED AND COMPRESSION MOLDED MATERIALS

This is a continuation-in-part of U.S. application Ser. No. 10/131,578, filed Apr. 24, 2002, now U.S. Pat. No. 6,637,213 which is a continuation-in-part of U.S. application Ser. No. 10/025,432, filed Dec. 19, 2001, now U.S. Pat. No. 6,708,504 which is a continuation-in-part of U.S. application Ser. No. 09/766,054, filed Jan. 19, 2001, now U.S. Pat. No. 6,578,368 each of which is hereby incorporated by reference in its entirety.

BACKGROUND AND SUMMARY OF THE INVENTION

The present invention relates generally to a system and method for cooling manufactured articles and, more particularly, to a system and method for cooling extruded and molded materials with a fluid that is below about 80 degrees Fahrenheit. The present invention may also be used in other types of manufacturing techniques in which the output or material must be cooled from a heated state. The present invention includes a system and method for cooling synthetic wood composite materials including, but not limited to, cellulosic-filled plastic composites. In addition, the present invention may also be used to cool other types of pure or mixed materials including, but not limited to, plastics, polymers, foamed plastics, plastic compositions, inorganic-filled plastic compositions, metals, metallic compositions, alloys, mixtures including any of the aforementioned materials, and other similar, conventional, or suitable materials that need to be cooled after being processed. For instance, the present invention may be used to cool polyvinyl chloride (PVC) products and products made from other plastics.

For several reasons, there is a need to find materials that exhibit the look and feel of natural wood. The supply of wood in the world's forests for construction and other purposes is dwindling. Consequently, the supply of wood from mature trees has become a concern in recent years, and the cost of wood has risen. As a result, several attempts have been made by others to find a suitable wood-like material.

Cellulosic/polymer composites have been developed as replacements for all-natural wood, particle board, wafer board, and other similar materials. For example, U.S. Pat. Nos. 3,908,902, 4,091,153, 4,686,251, 4,708,623, 5,002,713, 5,055,247, 5,087,400, 5,151,238, 6,011,091, and 6,103,791 relate to processes and/or compositions for making wood replacement products. As compared to natural woods, cellulosic/polymer composites offer superior resistance to wear and tear. In addition, cellulosic/polymer composites have enhanced resistance to moisture, and it is well known that the retention of moisture is a primary cause of the warping, splintering, and discoloration of natural woods. Moreover, cellulosic/polymer composites may be sawed, sanded, shaped, turned, fastened, and finished in the same manner as natural woods. Therefore, cellulosic/polymer composites are commonly used for applications such as interior and exterior decorative house moldings, picture frames, furniture, porch decks, deck railings, window moldings, window components, door components, roofing structures, building siding, and other suitable indoor and outdoor items. However, many attempts to make products from cellulosic/polymer composite materials have failed due to poor or improper manufacturing techniques.

In the present invention, a product or article is manufactured by a desired technique such as, but not limited to, extrusion, compression molding, injection molding, or other similar, suitable, or conventional manufacturing techniques. The product is then cooled by subjecting it to a cooling fluid including, but not limited to, direct contact with a liquid cryogenic fluid. The present invention can be used alone or in conjunction with other known or later developed cooling methods. Accordingly, the present invention can more thoroughly and efficiently cool the manufactured product or article to a desired level. This can lead to faster production times as well as a product having improved structural, physical, and aesthetic characteristics.

In addition to the novel features and advantages mentioned above, other objects and advantages of the present invention will be readily apparent from the following descriptions of the drawings and exemplary embodiments.

DETAILED DESCRIPTION OF EXEMPLARY EMBODIMENT(S)

The present invention is directed to a system and method for cooling manufactured articles or products. It is not intended to limit the present invention to particular manufacturing techniques or particular materials. The present invention may be used to cool articles or products made by variety of different manufacturing techniques. Examples of manufacturing techniques that may utilize the present invention include, but are not limited to, extrusion (including co-extrusion), compression molding, injection molding, and other known, similar, or conventional techniques for manufacturing products or articles from plastic, wood, metal, mixtures of these materials, or other materials used to make products.

The present invention is particularly useful for cooling plastics, polymers, and cellulosic/polymer composite materials that have been extruded or molded. The materials that may be used to make cellulosic/polymer composites include, but are not limited to, cellulosic fillers, polymers, plastics, thermoplastics, inorganic fillers, cross-linking agents, lubricants, process aids, stabilizers, accelerators, inhibitors, enhancers, compatibilizers, blowing agents, foaming agents, thermosetting materials, and other similar, suitable, or conventional materials. Examples of cellulosic fillers include sawdust, newspapers, alfalfa, wheat pulp, wood chips, wood fibers, wood particles, ground wood, wood flour, wood flakes, wood veneers, wood laminates, paper, cardboard, straw, cotton, rice hulls, coconut shells, peanut shells, bagass, plant fibers, bamboo fiber, palm fiber, kenaf, flax, and other similar materials. In addition to PVC, examples of polymers include multilayer films, high density polyethylene (HDPE), polypropylene (PP), low density polyethylene (LDPE), chlorinated polyvinyl chloride (CPVC), acrylonitrile butadiene styrene (ABS), ethyl-vinyl acetate, other similar copolymers, other similar, suitable, or conventional thermoplastic materials, and formulations that incorporate any of the aforementioned polymers. Examples of inorganic fillers include talc, calcium carbonate, kaolin clay, magnesium oxide, titanium dioxide, silica, mica, barium sulfate, acrylics, and other similar, suitable, or conventional materials. Examples of thermosetting materials include polyurethanes, such as isocyanates, phenolic resins, unsaturated polyesters, epoxy resins, and other similar, suitable, or conventional materials. Combinations of the aforementioned materials are also examples of thermosetting materials. Examples of lubricants include zinc stearate, calcium stearate, esters, amide wax, paraffin wax, ethylene bis-stearamide, and other similar, suitable, or conventional materials. Examples of stabilizers include tin stabilizers, lead and metal soaps such as barium, cadmium, and zinc, and other similar, suitable, or conventional materials. In addition, examples of process aids include acrylic modifiers and other similar, suitable, or conventional materials.

Figure 1:
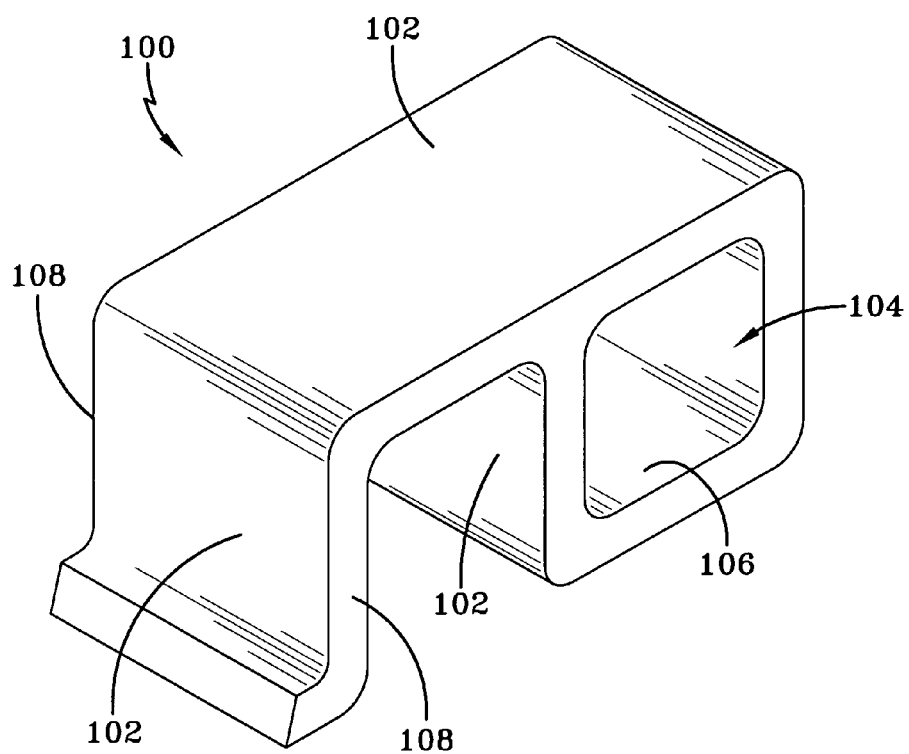
FIG. 1 is a cross sectional view of an extrudate.

FIG. 1 shows one example of an extrudate 100 that may be cooled by the present invention. The extrudate 100 includes an exterior surface 102, a hollow 104, an interior surface 106, and two ends 108. The exterior surface 102 may be cooled by a traditional method such as using a warm water bath or water mist. However, the interior surface 106' may not be sufficiently cooled by many traditional methods because the surface may not be available for contact with the cooling medium. The interior surface 106 defines the boundary of the hollow 104. The interior surface 106 may be accessed from either end 108. The interior surface 106 may not be cooled to a desired level within a desired amount of time by externally applied coolants.

Figure 2:
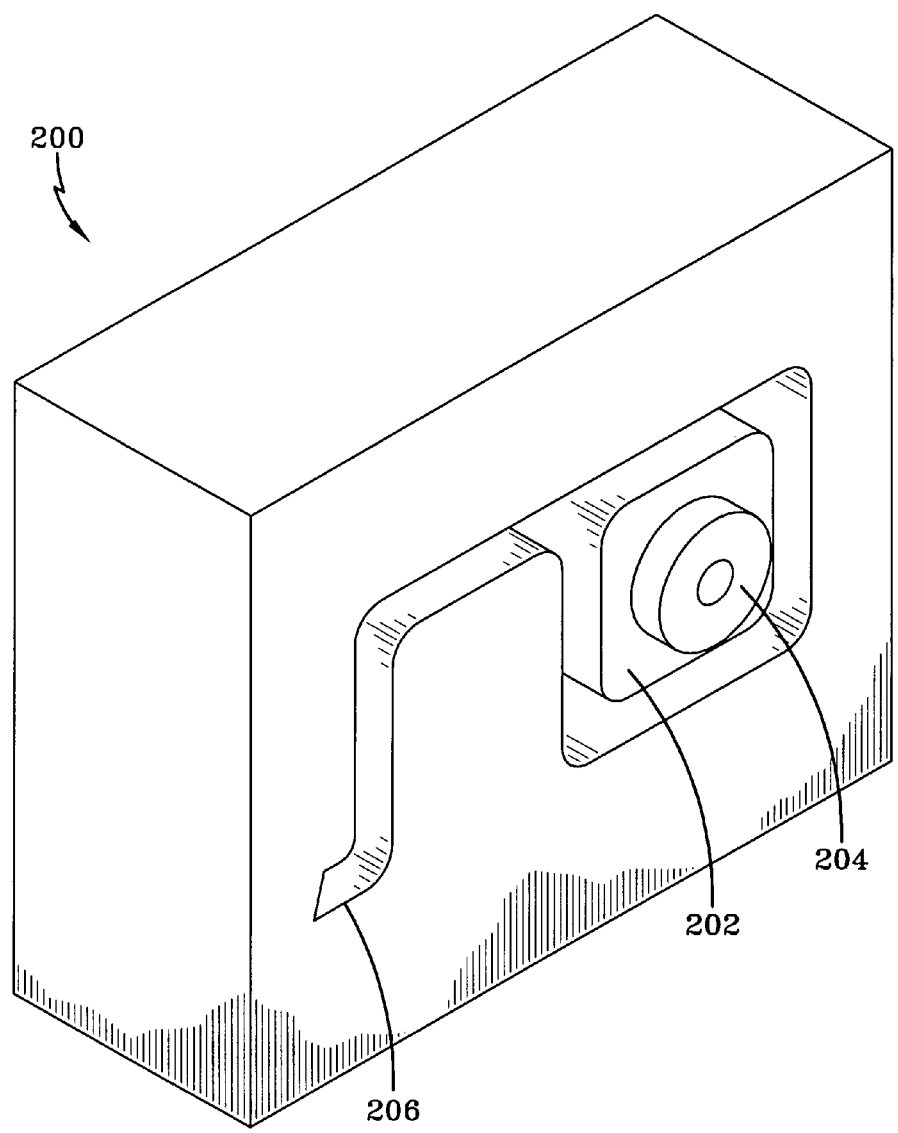
FIG. 2 is a view of an extrusion die showing an exemplary location of a cryogenic nozzle.

FIG. 2 shows one example of an extrusion die 200 adapted with the present invention. The extrusion die 200 defines the cross section of the extrudate by the shape of the profile form/flow channel 206. Hollows in the cross section of the extrudate are each formed with a standing core 202. The standing core 202 is fitted with a nozzle 204. The nozzle 204 is adapted to connect with a source of the cooling fluid (not shown). The nozzle 204 is oriented to spray into the hollow formed in the extrudate cross section by the standing core 202.

Figure 3:
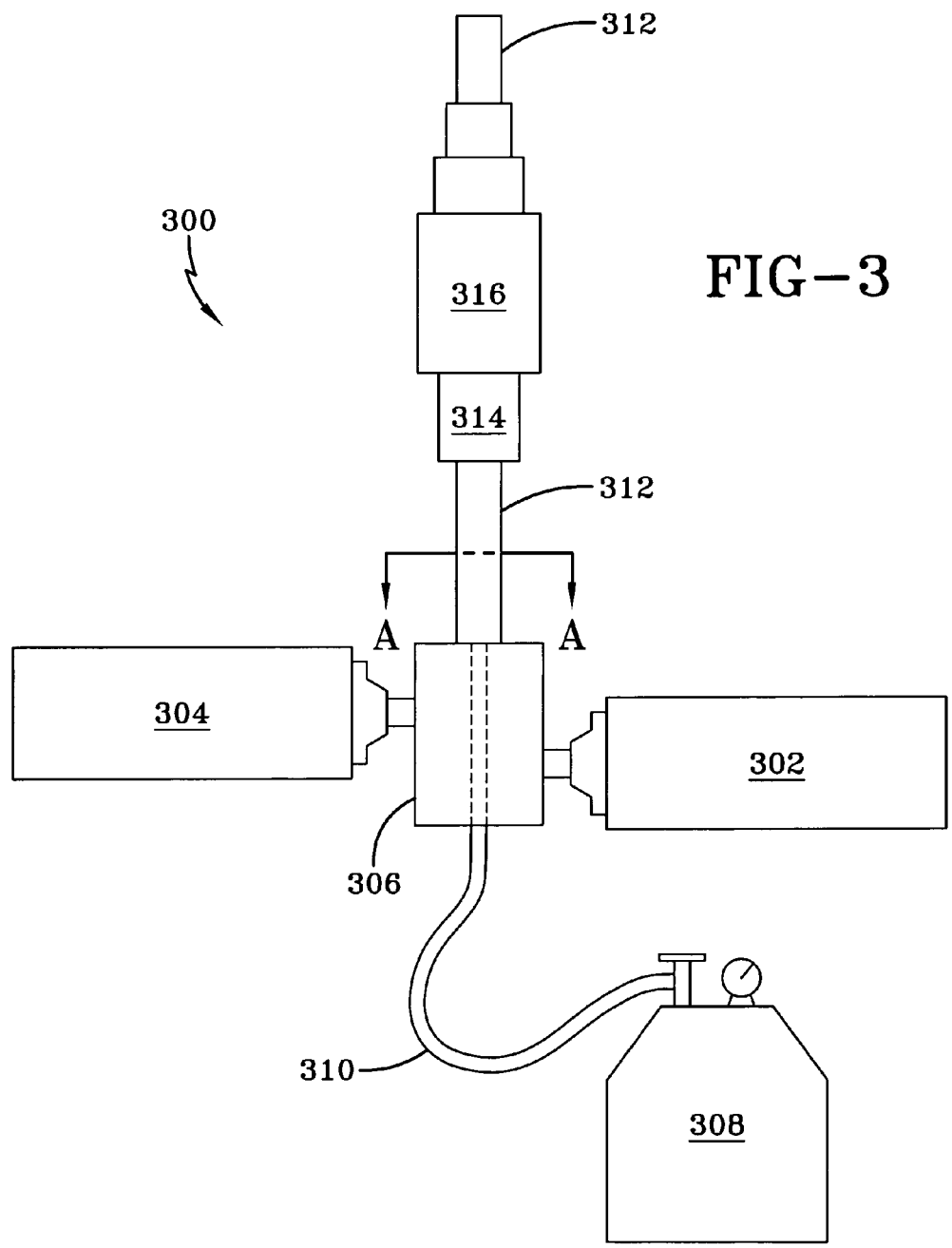
FIG. 3 is an elevation view of one embodiment of a system implementing the present invention.

FIG. 3 shows one example of a system 300 that may utilize the present invention. The system 300 includes an extruder 302 and an extruder 304. In this example, a crosshead die 306 puts a cap layer from the extruder 304 on the material extruded by the extruder 302. A container 308 may be used to hold a cooling fluid of the present invention. The fluid is used to cool the extruded product or article 312 after it exits the die 306. In this embodiment, a valve is used to control the release of gas, e.g., vapor, from the fluid. A hose, conduit, tube, or any other suitable transfer device 310 may be used to direct the gas from the container 308 to the desired location for cooling the extruded product 312. The transfer device 310 may be formed by one integral component or a plurality of interconnected components. For instance, a portion of the transfer device 310 may be a passage through the die 306. In this example, the transfer device 310 extends through the die 306 so that the gas is released in the hollow of the extruded product 312 after it exits the die 306. In this manner, the present invention can provide efficient and thorough cooling of the extruded product 312. Moreover, the extruded product 312 may be further introduced into a liquid bath 314, a spray mist chamber 316, and/or any other desired cooling system to achieve additional cooling of the extruded product 312 if desired. Examples of the liquid bath 314 and the spray mist chamber 316 are provided in U.S. Pat. No. 5,827,462.

Depending on the type of cooling fluid and the desired expulsion rate of the cooling fluid, the container 308 may be pressurized. The container 308 may be connected to a compressor, e.g., an air compressor or any other similar, suitable, or conventional compressing device, in order to maintain the desired pressure in the container 308. Additionally, the container 308 may be in fluid communication with a blower or a pump to obtain the desired expulsion rate of the cooling fluid from the container 308. A blower in fluid communication with the container 308 may also be utilized to accelerate the cooling fluid to a desired velocity after it has been expelled.

Figure 4:
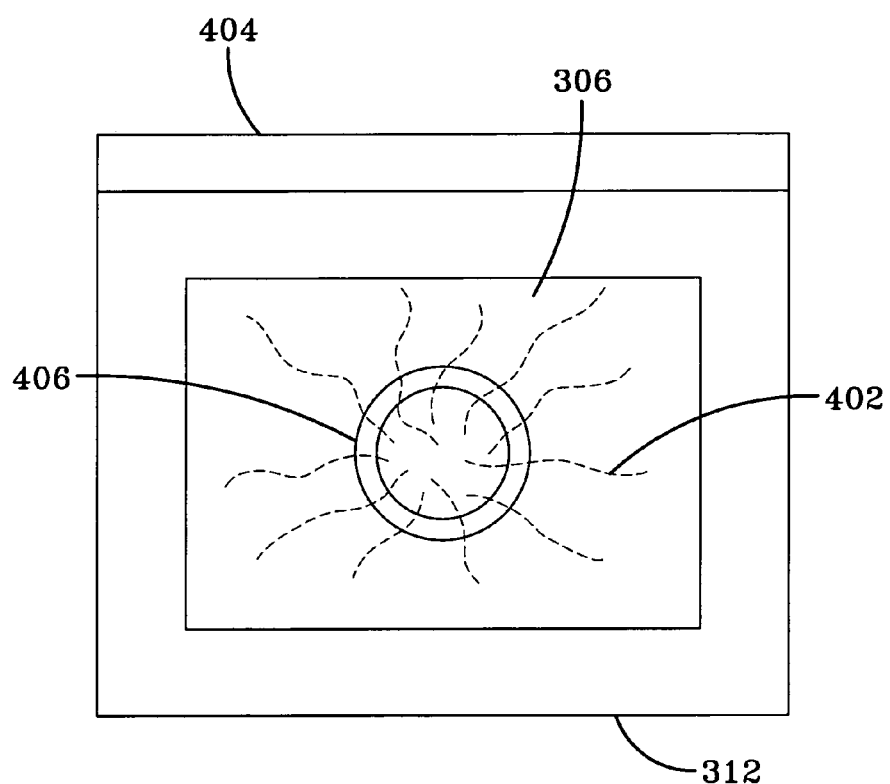
FIG. 4 is a partial cross sectional view along the line A—A of FIG. 3.

FIG. 4 is a cross section view along the line A—A of FIG. 3. The extruded product 312 includes a cap layer 404. The transfer device 310 may extend through the die 306 to a nozzle 406 that releases gas from the cooling fluid into a hollow of the extruded product 312. In this instance, gas vapor 402 permeates through the hollow of the extruded product 312, thereby providing much improved cooling of the extruded product 312. In fact, the inventors have surprisingly discovered that using the present invention to inject the cooling fluid into a hollow portion of a product may be sufficient to thoroughly cool the entire product, i.e., the inside and the outside of the product. As a result, the present invention may eliminate the need to provide another cooling system to cool the outer surface of the product.

It should be recognized that FIGS. 3 and 4 are merely one example of a manufacturing system that may utilize the present invention. As noted above, the present invention may be used in any manufacturing system in which the processed material needs to be cooled to a desired level. For example, the present invention may be used in an extrusion system consisting of a single extruder that is in-line with a die. Also, the present invention may be used to cool any type of material including, but not limited to, injection molded materials and compression molded materials.

Figure 5:
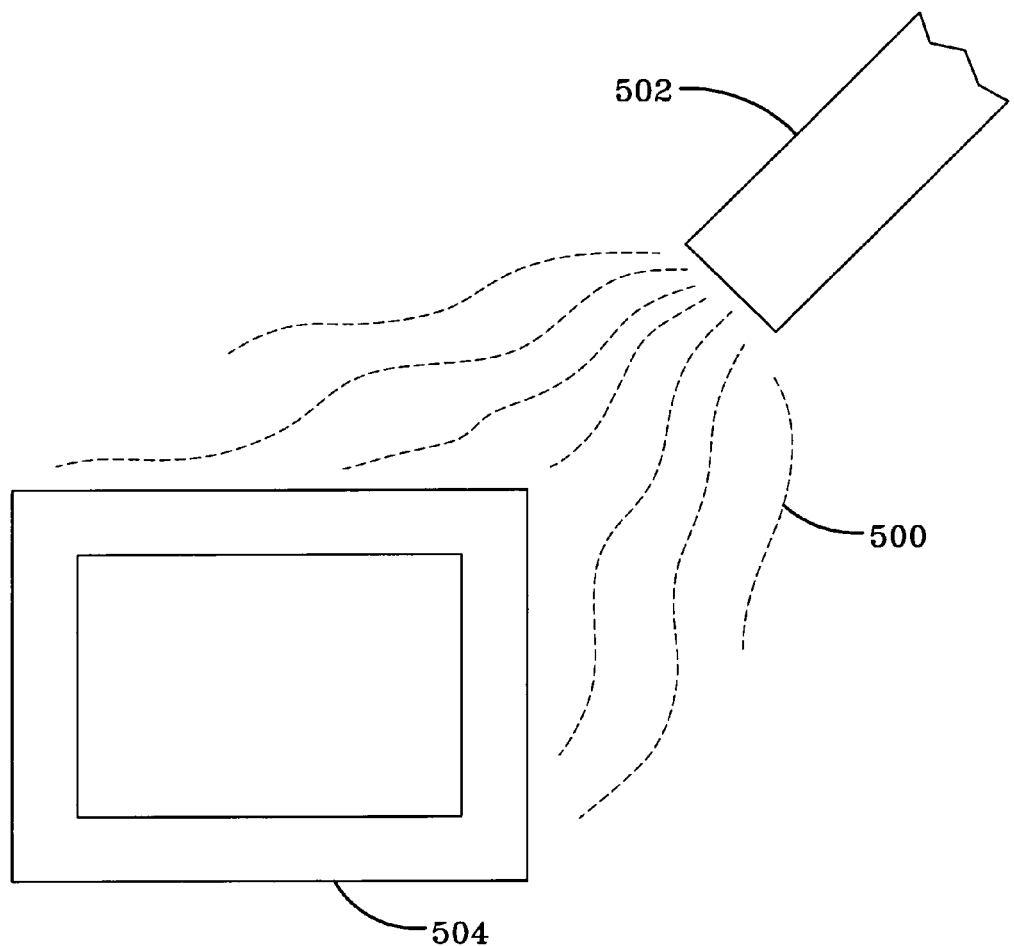
FIG. 5 is a partial elevation view of another embodiment of a system of the present invention.

It should also be recognized that the cooling fluid of the present invention may be expelled elsewhere relative to the manufactured product (i.e., other than in a hollow portion of the product). For example, FIG. 5 shows an embodiment in which the gas vapor 500 is dispersed by the transfer device 502 onto the exterior of the product 504. The present invention also includes dispersing multiple streams of the cooling fluid onto the same or different portions of the manufactured product. For instance, flows of the cooling fluid may be simultaneously dispersed onto the exterior and interior surfaces of the manufactured product.

Figure 6:
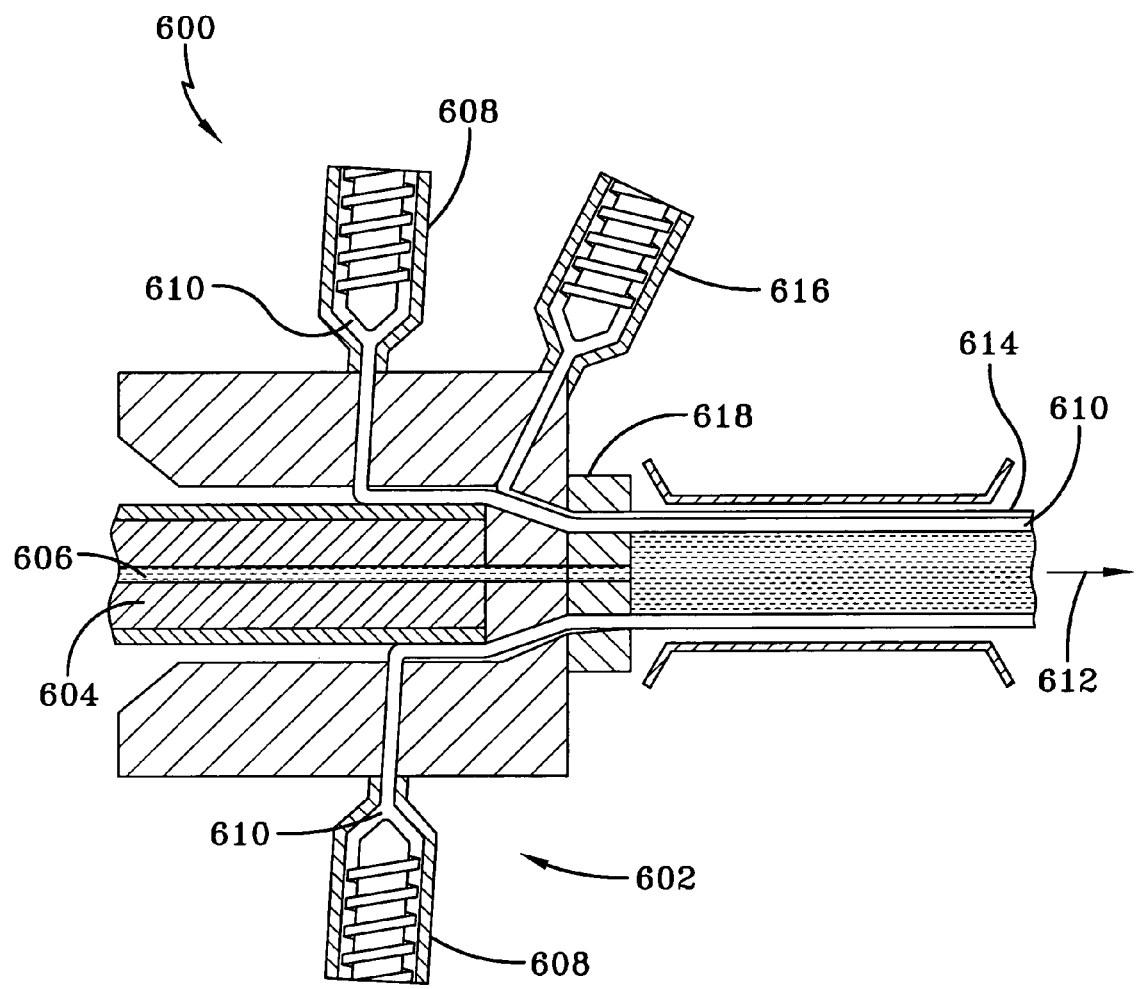
FIG. 6 shows a sectioned schematic of an extruder line used in accordance with the practice of one embodiment of the present invention.

Turning to FIG. 6, this Figure shows a sectioned schematic of an extruder line 600 used in accordance with the practice of one embodiment of the present invention. FIG. 6 shows an extruder line 600 which includes co-extrusion apparatus 602. Co-extrusion apparatus 602 includes insulated transport tube 604 that is adapted to carry cooling fluid 606. The cooling fluid 606 may be gas that may be delivered from a supply of cryogenic fluid. Co-extrusion apparatus 602 also includes a cross head extruder 608 which is adapted to prepare the thermoplastic material 610 for extrusion through a die which forms a hollow, rectangular profile and urges it along longitudinal direction 612. Further layers of thermoplastic material such as layer 614 may be added through the use of additional extruders such as extruder 616. Such additional layers of thermoplastic material may include layers of material with specific characteristics for exterior use, such as fluoropolymers and PVC having greater or lesser durability and resistance to changes in aesthetic appearance resulting from exposure to weather and environmental/atmospheric conditions, as dictated by the desired end user. The thermoplastic material 610 is formed by the forming die 618 into the desired final shape, such as a rectangular cross-section. The cooling fluid 606 permeates through the hollow space created in thermoplastic material 610. The cooling fluid 606 may be at a significantly lower temperature than the surrounding thermoplastic material 610. The cooling fluid 606 cools the thermoplastic material 610, assisting the thermoplastic material to "skin" or solidify.

Figure 7:
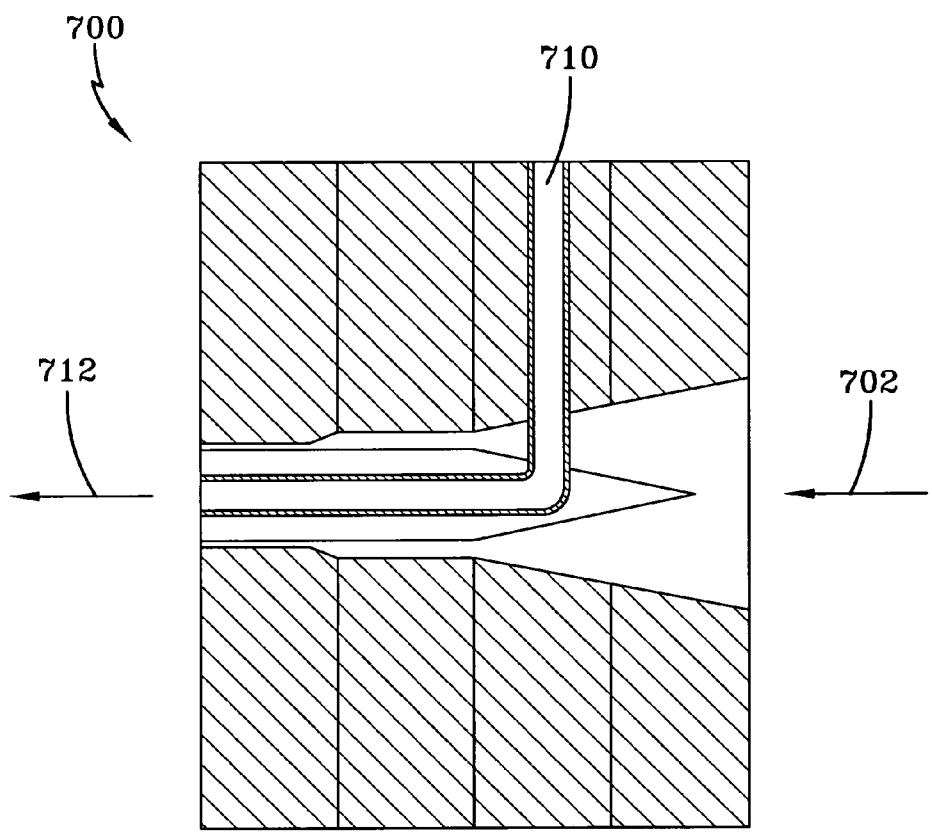
FIG. 7 is a cross sectional view from a lateral side angle of an exemplary die of the present invention.
Figure 8:
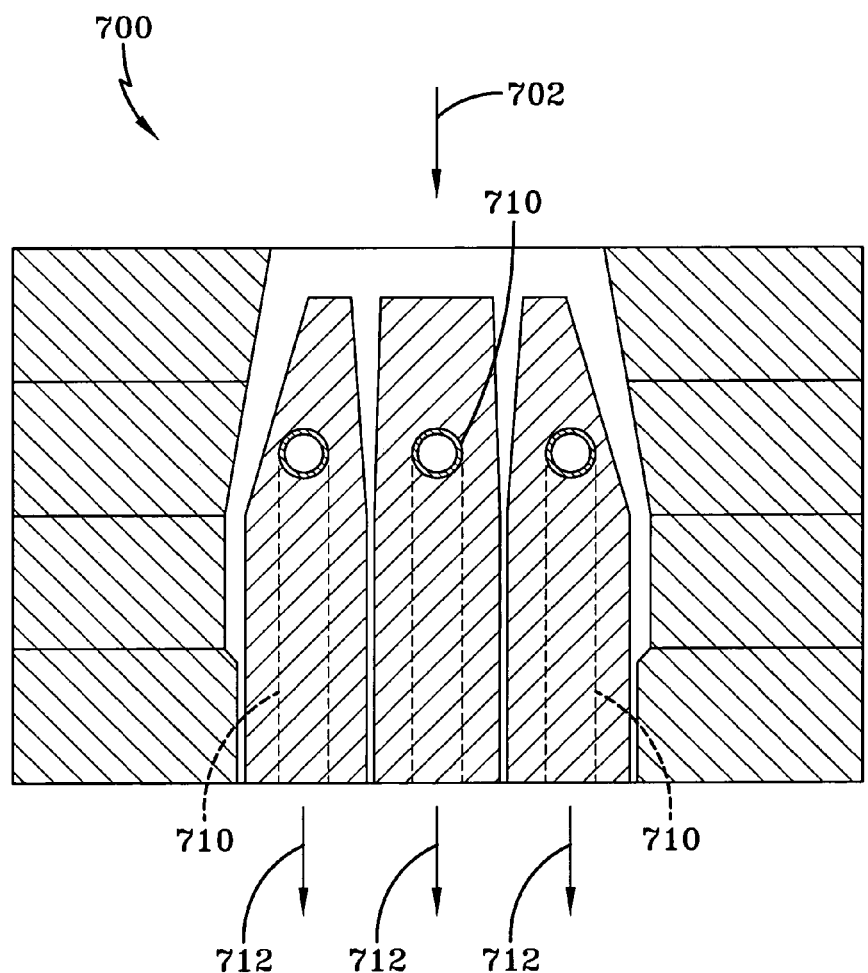
FIG. 8 is a cross sectional view from a top side angle of the die of FIG. 7.
Figure 9:
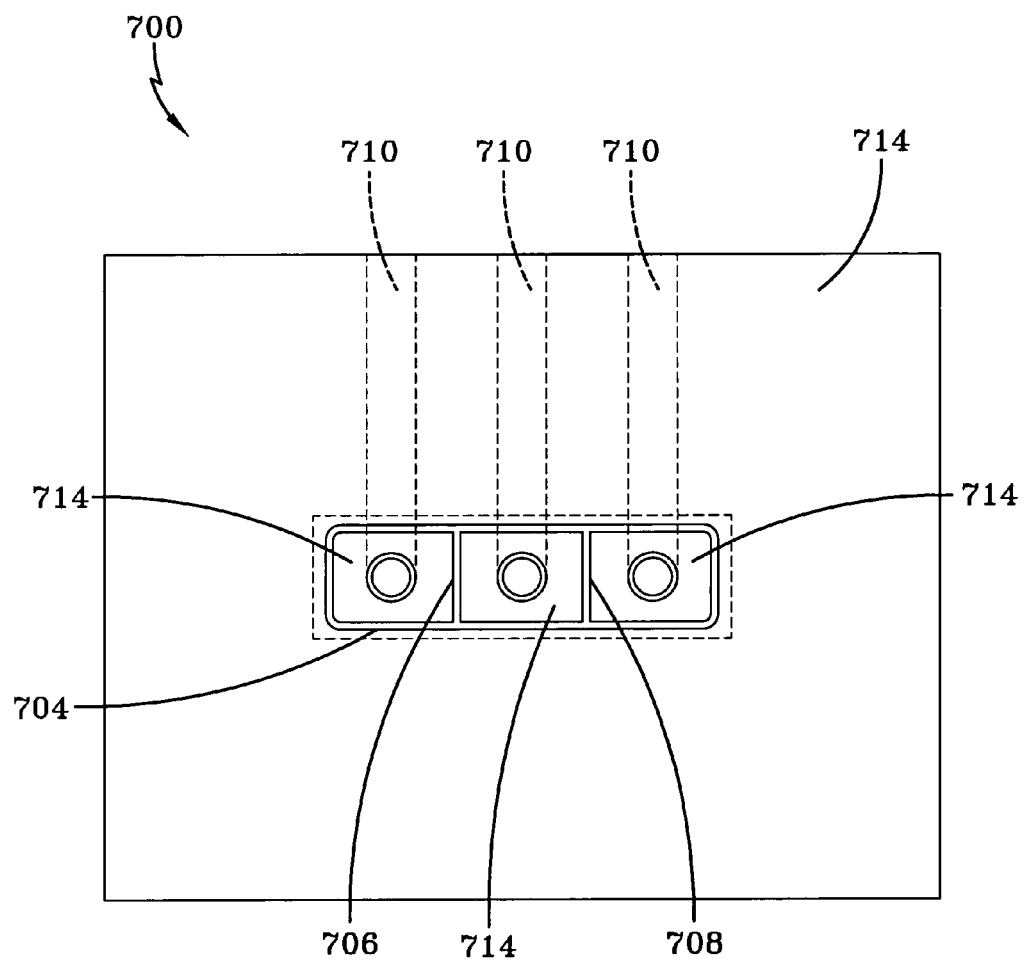
FIG. 9 is a cross sectional view from an exit side angle of the die of FIG. 7.

FIGS. 7 through 9 show a cross sectional view of one example of a die 700 that is configured to be in-line with an extruder. The extruded material flows through the die in the direction indicated by arrow 702. In this example, the resultant extrudate 704 defines three hollow portions that are separated by webs 706 and 708. The cooling fluid enters the die 700 through passages 710. In some embodiments, it should be recognized that a tube, conduit, or any other type of transfer device may extend through the passages 710 for directing the flow of the cooling fluid through the passages 710. The cooling fluid exits the die 700 through passages 710 in the direction indicated by arrows 712. In such an embodiment, the passages 710 intersect the path of flow of the extruded material through the die 700. In other words, the passages 710 intersect the flow channel in the die 700.

The die 700 may be heated to a sufficient level to facilitate extrusion and limit premature curing of the extrudate in the die 700. In this example of an in-line system, the passages 710 actually extend through the die 700, intersecting the path of flow of the extruded material through the die 700. In such embodiments, it may be preferable to limit cooling of the die 700 by the cooling fluid in the passages 710. Accordingly, the passages 710 may be insulated by a suitable material. For example, the passages 710 may be lined with ceramic insulation, putty ceramics, or any other similar, suitable, or conventional insulating material in order to limit undesired heat loss by the die 700. In fact, it should be recognized that the transfer device for the cooling fluid in any type of embodiment may be insulated in order to limit undesired cooling of surrounding items.

As best seen in the example of FIG. 9, the passages 710 may be substantially surrounded by die material 714 even where the passages 710 intersect the path of flow of the extruded material. In this manner, direct contact between the extruded material and the passages 710 may be avoided, if desired. The die material 714 surrounding the passages 710 may be heated to facilitate the extrusion process. Also, air gaps may be provided between the die material 714 and the passages 710 for additional insulation.

Any desired cooling fluid may be used in the present invention. In one exemplary embodiment, the cooling fluid, e.g., gas or liquid, may have a temperature below about 80 degrees Fahrenheit, more preferably below about 68 degrees Fahrenheit, still more preferably below about 32 degrees Fahrenheit, even more preferably below about minus 100 degrees Fahrenheit. On the other hand, the temperature may be above about minus 325 degrees Fahrenheit, more preferably above about minus 300 degrees Fahrenheit, still more preferably above about minus 275 degrees Fahrenheit, even more preferably above about minus 250 degrees Fahrenheit. However, in some embodiments of the present invention, the cooling fluid may be above about 80 degrees Fahrenheit or below about minus 325 degrees Fahrenheit. Examples of the cooling fluid are air and water. Another example of the cooling fluid is gas or vapor that is produced from a cryogenic fluid. For instance, a cryogenic fluid may have a temperature below about minus 250 degrees Fahrenheit. Examples of cryogenic fluids include, but are not limited to, liquid oxygen, liquid nitrogen, liquid neon, liquid hydrogen, liquid helium, and other similar, suitable, or conventional cryogenic fluids.

In addition to the temperature, the velocity of the cooling fluid may also impact its effectiveness. By selecting a suitable velocity and temperature of the cooling fluid, the inventors have discovered that an entire product can be thoroughly cooled just by injecting the cooling fluid into a hollow portion of the product. The velocity of the cooling fluid may be greater than about 10 miles per hour, more preferably greater than about 40 miles per hour, and it may be less than about 100 miles per hour, more preferably less than about 50 miles per hour. However, it should be recognized that the velocity of the cooling fluid may be less than about 10 miles per hour or greater than about 100 miles per hour in some embodiments.

The efficiency of the present invention may be further increased by diverting the flow of the cooling fluid toward the surface of the extruded product as it exits the die. By concentrating the cooling fluid on a surface of the extrudate, the desired amount of cooling may occur more quickly resulting in the use of less cooling fluid as compared to non-diversion methods. Moreover, the increased cooling efficiency enables the use of warmer cooling fluids and a reduction in the velocity of the cooling fluid as compared to non-diversion methods. For example, this embodiment of the present invention may be particularly useful if it is desired to use a cooling fluid that is warmer than about 80 degrees Fahrenheit. However, it should be recognized that, in many embodiments, it may be desirable to use a cooling fluid below about 80 degrees Fahrenheit for optimal cooling efficiency.

Figure 10:
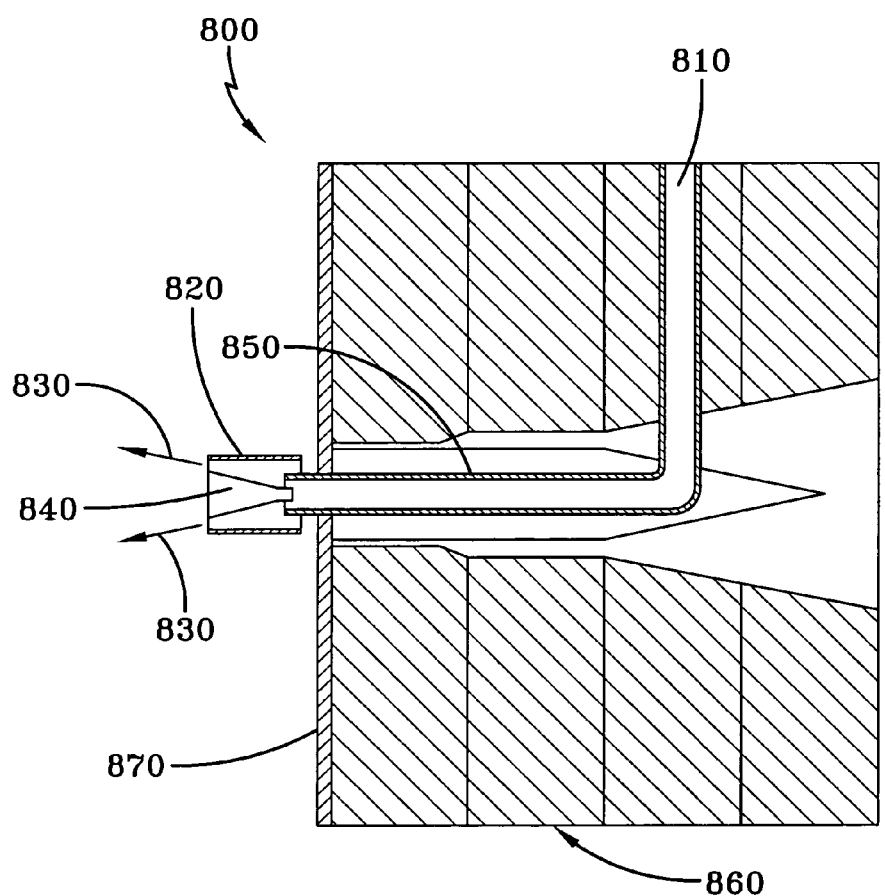
FIG. 10 is a cross sectional view from a lateral side angle of an exemplary die of the present invention that includes a baffle.

FIG. 10 shows one example of a die that is adapted to divert a cooling fluid toward a surface of an extruded project. The die 800 of this embodiment may include any of the optional or preferred features of the die 700 shown in FIGS. 7 through 9. The cooling fluid may enter the die 800 through a passage 810. A baffle 820 is in fluid communication with the passage 810 such it receives the cooling fluid. The baffle 820 is adapted to then divert the flow of the cooling fluid such that it is directed to a desired surface of the extrudate. By directing the cooling fluid toward a surface of the extrudate, the baffle 820 may also create a more turbulent flow of the cooling fluid (as compared to a straight line flow that is not directed toward a surface of the extrudate) which further enhances the efficiency of the cooling process. The baffle 820 may be any device or structure that is suitable for diverting the flow of the cooling fluid to the desired location (e.g., an interior or exterior surface of a product). In this particular example, the baffle 820 is adapted to divert the cooling fluid in the direction of arrows 830 toward an interior surface of a hollow portion of the extrudate. For this purpose, the baffle 820 includes an inner conical portion 840 that forces the cooling fluid in the direction of arrows 830.

FIG. 10 shows one example of a design of a baffle 820. It should be recognized that the design of a baffle of the present invention may vary so as to divert the cooling fluid in the desired direction. Of course, the desired direction will vary according to the type of product being extruded and the location of the baffle relative to the extruded product.

The baffle 820 may be placed in fluid communication with the passage 810 in any suitable manner. In the example of FIG. 10, the baffle 820 is secured to an end portion of a conduit 850 that extends through the passage 810. The baffle 820 may be secured to the end portion of the conduit 850 in any desired manner. For example, the baffle 820 may be threaded, i.e., screwed, onto the end portion of the conduit 850. For other examples, the baffle 820 may be secured to the conduit 850 using other mechanical means (e.g., screws, pins, and other types of mechanical fastening devices) and/or adhesives. As previously noted, the conduit 850 may be insulated. The baffle 820 may also be insulated, if desired. The baffle 820 is offset from the heated portion 860 of the die 800 in this particular example. Optionally, there may be an insulated layer 870 on an exit end of the die 800. The insulated layer 870 may be useful to prevent the cooling fluid from cooling the heated portion 860 of the die 800.

Figure 11:
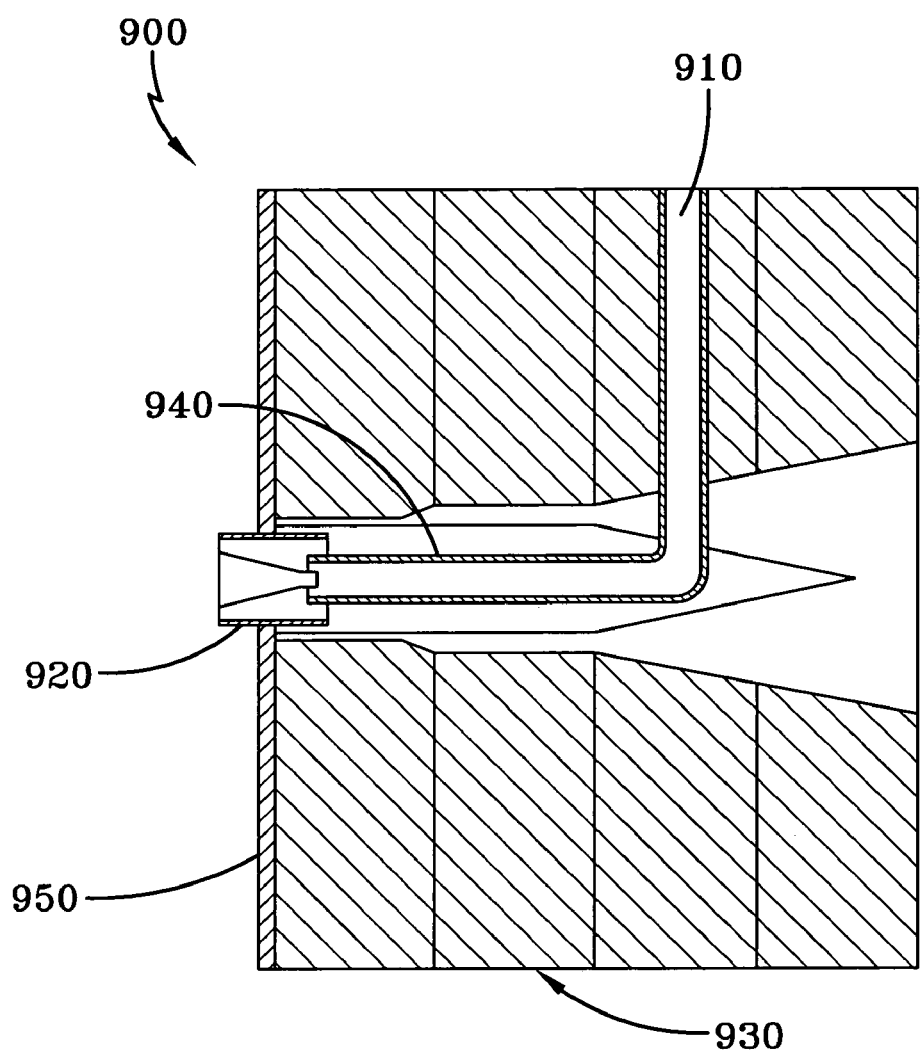
FIG. 11 is a cross sectional view from a lateral side angle of another exemplary die of the present invention that includes a baffle.

FIG. 11 shows another example of a die which may include any of the optional or preferred features of the other embodiments of the present invention. In this embodiment, the die 900 includes a passage 910 that is in fluid communication with the baffle 920. The baffle 920 is not offset from the heated portion 930 of the die 900 in this example. In order to limit undesired cooling of the heated portion 930, it may be preferred to use an insulated baffle 920 or otherwise provide a layer of insulation between the baffle 920 and the heated portion 930. As in the previous example, the baffle 920 may be connected to a conduit 940 that lines that passage 910. It should also be recognized that the baffle 920 may be placed in fluid communication with the passage 910 in any other suitable manner. For example, the baffle 920 may have a threaded connection with the heated portion 930. In other examples, the baffle 920 may be connected to the heated portion 930 using other mechanical means (e.g., screws, pins, and other types of mechanical fastening devices) and/or adhesives. As in the previous example, an exit end of the die 900 may include a layer of insulation 950.

The inventors have also made the surprising and significant discovery that the efficiency and efficacy of the manufacturing process may be improved by placing a liquid cryogenic fluid in direct contact with the material to be cooled. As a result, the rate of output may be increased, thereby decreasing the unit cost of the manufactured product. In addition, the inventors have discovered that the more rapid cooling providing by direct contact with a liquid cryogenic fluid may improve the structural characteristics of the manufactured product, especially in the case of foam products. In particular, the rapid removal of the heat may help to maintain the desired foam structure.

Figure 12:
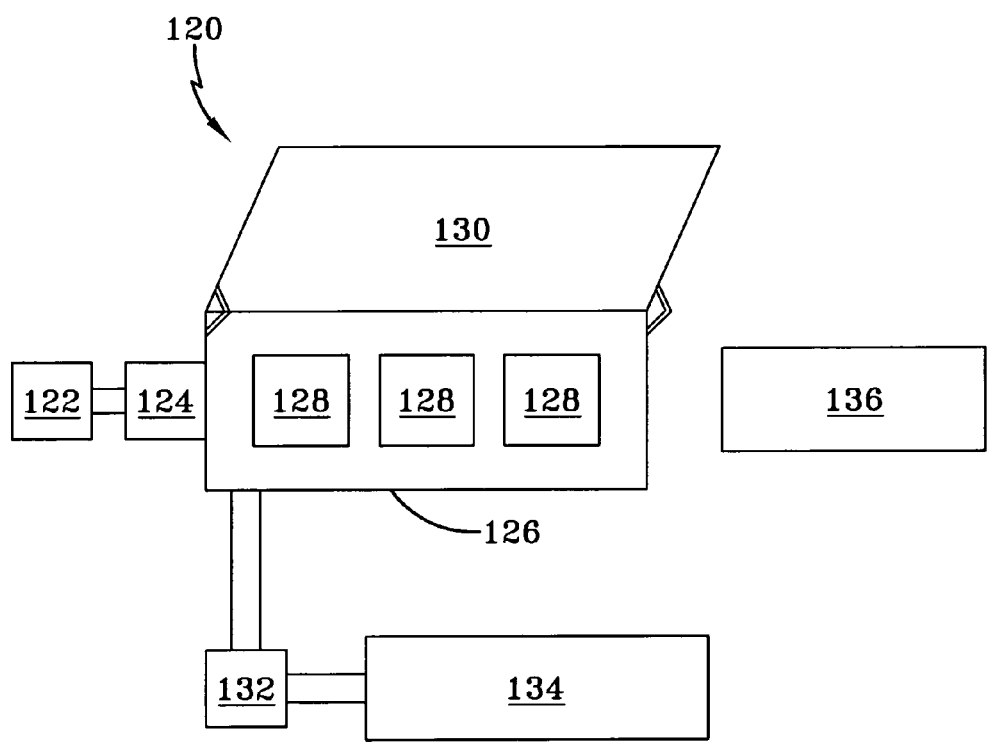
FIG. 12 is a schematic view of an exemplary embodiment of a system of the present invention that enables direct cooling by a liquid cryogenic fluid.

FIG. 12 shows one example of a system that enables direct contact of the material with the liquid cryogenic fluid. System 120 may include a die 122 which is adapted to receive material from a piece of processing equipment, e.g., an extruder. Optionally, a sizer 124 may be in fluid communication with the die 122. One example of a sizer 124 is a vacuum sizer. After the material exits the die 122 and, optionally, sizer 124, the material enters a bath 126 of liquid cryogenic fluid. In the bath 126, the material comes into direct contact with the liquid cryogenic fluid. The duration of the contact may vary according to the particular material, manufacturing process, and degree of cooling that is desired. Nevertheless, it should be recognized that just a brief period of contact (e.g., mere seconds) may provide a significant of degree of heat removal. Depending on the material, overexposure to the liquid cryogenic fluid may eventually have a negative impact on the manufactured product.

The features and physical dimensions of the bath 126 may be selected taking into consideration the minimum length of material needed for a specific application, the line speed, the desired amount of heat removal, and other factors relevant to the safety, maintenance, and performance of the system 120. In one exemplary embodiment, the bath 126 may include at least one sizing component (i.e., sizer or sizing box) 128. A sizing component 128 may be partially or totally submersed in the liquid cryogenic fluid during operation of the system 120. The bath 126 may also be equipped with suitable safety and maintenance features. For example, the bath 126 may have a cover 130 to facilitate maintenance of the bath 126. Additionally, the bath 126 may be dual-walled and insulated, and the bath 126 may include a suitable exhaust system.

The bath 126 may include a level of liquid cryogenic fluid sufficient to partially or totally submerse the material to be cooled. For instance, the bath 126 may include a level of liquid cryogenic fluid sufficient to directly contact one portion of the material to be cooled while another portion does not come into contact with the liquid cryogenic fluid. Moreover, it should be recognized that the liquid cryogenic fluid may be transferred into and out of the bath 126 based on the operational status of the system 120. For example, the system 120 may also include a pump 132 and a holding tank 134. The pump 132 may transfer the liquid cryogenic fluid to the bath 126 from the tank 134 approximately when the particular manufacturing process (e.g., extrusion) is initiated or at any other suitable time such that there is a desired amount of liquid cryogenic fluid in the bath 126. Furthermore, the pump 132 may transfer the liquid cryogenic fluid back to the tank 134 after the manufacturing process (e.g., extrusion) is complete or at any other suitable time. The tank 134 may be equipped with any suitable safety and maintenance features including, but not limited to, those included on the bath 126. Additionally, it should be recognized that a suitable safety interlock system may be included to prohibit undesired transfer of the liquid cryogenic fluid between the bath 126 and the tank 134.

At least one additional cooling system 136 may be included subsequent to the bath 126. Examples of a cooling system 136 include, but are not limited to, a water bath, a spray mist, air flow, another cooling system as described herein, or any other conventional or new cooling system. Additionally, it should be noted that a cooling system 136 (or additional manufacturing equipment) may be included prior to the bath 126 without departing from the scope of the present invention.

As mentioned above, many significant advantages may be achieved by placing the material to be cooled in direct contact with liquid cryogenic fluid. In addition to cooling extruded products, the present invention may be used to cool products made by any other methods including, but not limited to, compression molded products and injection molded products. Regardless of the manufacturing method, the output rate may increased and the unit cost may be decreased due to the dramatic improvement in cooling efficiency. Also, the capital cost of an exemplary system of the present invention may be reduced as compared to conventional gas cooling systems which require some gas velocity. In addition, the increased cooling efficiency may allow shorter manufacturing lines, thereby further reducing the manufacturing cost.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A system for cooling a material, said system comprising:
   an extruder;
   at least one die adapted to receive said material from said extruder;
   a tank for storing a liquid cryogenic fluid;
   a bath adapted to receive said material after said at least one die, said bath further adapted to receive said liquid cryogenic fluid from said tank such that said liquid cryogenic fluid is adapted to directly contact said material in said bath; and
   a pump in fluid communication with said tank and said bath, said pump adapted to transfer said liquid cryogenic fluid into said bath from said tank approximately when extrusion of said material is initiated.

2. The system of claim 1 wherein said material is selected from the group consisting of plastics, polymers, thermoplastics, foamed plastics, plastic composites, foamed plastic composites, cellulosic-filled plastic composites, inorganic-filled plastic composites, metals, metallic composites, alloys, and mixtures of any of the aforementioned materials.

3. The system of claim 1 wherein said liquid cryogenic fluid is selected from the group consisting of liquid oxygen, liquid nitrogen, liquid neon, liquid hydrogen, and liquid helium.

4. The system of claim 1 wherein said bath includes a level of said liquid cryogenic fluid sufficient to totally submerse said material.

5. The system of claim 1 further comprising at least one sizing component in said bath.

6. The system of claim 1 wherein:
   said at least one die is adapted to receive a continuous flow of said material from said extruder; and
   said bath is adapted to receive said continuous flow of said material after said at least one die.

7. A method for cooling a material, said method comprising:
   providing an extruder;
   providing at least one die that is adapted to receive said material from said extruder;
   extruding said material through said at least one die;
   pumping a liquid cryogenic fluid into a bath approximately when said extruding of said material is initiated; and
   directly contacting said material with said bath of liquid cryogenic fluid after said material exits said at least one die.

8. The method of claim 7 wherein said material is selected from the group consisting of plastics, polymers, thermoplastics, foamed plastics, plastic composites, foamed plastic composites, cellulosic-filled plastic composites, inorganic-filled plastic composites, metals, metallic composites, alloys, and mixtures of any of the aforementioned materials.

9. The method of claim 7 wherein said liquid cryogenic fluid is selected from the group consisting of liquid oxygen, liquid nitrogen, liquid neon, liquid hydrogen, and liquid helium.

10. The method of claim 7 wherein:
    said bath of liquid cryogenic fluid is adjacent to said at least one die; and
    said material continuously flows from said extruder into said bath.

11. A system for cooling a material, said system comprising:
    an extruder;
    at least one die adapted to receive said material from said extruder;
    a tank for storing a liquid cryogenic fluid;
    a bath adapted to receive said material after said at least one die, said bath further adapted to receive said liquid cryogenic fluid from said tank such that said liquid cryogenic fluid is adapted to directly contact said material in said bath; and
    a pump in fluid communication with said tank and said bath, said pump adapted to transfer said liquid cryogenic fluid into said bath from said tank, said pump further adapted to transfer said liquid cryogenic fluid into said tank from said bath approximately when extrusion of said material is complete.

12. The system of claim 11 wherein said material is selected from the group consisting of plastics, polymers, thermoplastics, foamed plastics, plastic composites, foamed plastic composites, cellulosic-filled plastic composites, inorganic-filled plastic composites, metals, metallic composites, alloys, and mixtures of any of the aforementioned materials.

13. The system of claim 11 wherein said liquid cryogenic fluid is selected from the group consisting of liquid oxygen, liquid nitrogen, liquid neon, liquid hydrogen, and liquid helium.

14. The system of claim 11 wherein said bath includes a level of said liquid cryogenic fluid sufficient to totally submerse said material.

15. The system of claim 11 further comprising at least one sizing component in said bath.

16. The system of claim 11 wherein:
    said at least one die is adapted to receive a continuous flow of said material from said extruder; and
    said bath is adapted to receive said continuous flow of said material after said at least one die.

17. A method for cooling a material, said method comprising:
    providing an extruder;
    providing at least one die that is adapted to receive said material from said extruder;
    extruding said material through said at least one die;
    directly contacting said material with a bath of liquid cryogenic fluid after said material exits said at least one die;
    providing a tank adapted to store said liquid cryogenic fluid; and pumping said liquid cryogenic fluid from said bath into said tank approximately when said extruding of said material is complete.

18. The method of claim 17 wherein said material is selected from the group consisting of plastics, polymers, thermoplastics, foamed plastics, plastic composites, foamed plastic composites, cellulosic-filled plastic composites, inorganic-filled plastic composites, metals, metallic composites, alloys, and mixtures of any of the aforementioned materials.

19. The method of claim 17 wherein said liquid cryogenic fluid is selected from the group consisting of liquid oxygen, liquid nitrogen, liquid neon, liquid hydrogen, and liquid helium.

20. The method of claim 17 wherein:
said bath of liquid cryogenic fluid is adjacent to said at least one die; and
said material continuously flows from said extruder into said bath.

* * * * *

UNITED STATES PATENT AND TRADEMARK OFFICE
CERTIFICATE OF CORRECTION

PATENT NO. : 7,017,352 B2 Page 1 of 1
APPLICATION NO. : 10/280735
DATED : March 28, 2006
INVENTOR(S) : Hutchison et al.

It is certified that error appears in the above-identified patent and that said Letters Patent is hereby corrected as shown below:

Column 3, line 40, please delete "106' " and insert -- 106 --.

Signed and Sealed this

Twenty-fourth Day of April, 2007

JON W. DUDAS
*Director of the United States Patent and Trademark Office*